Patented Oct. 9, 1945

2,386,553

UNITED STATES PATENT OFFICE 2,386,553

LUBRICANTS

William P. Hilliker, Chesterton, Ind., assignor to Standard Oil Company, Chicago, Ill., a corporation of Indiana No Drawing. Application October 30, 1943, Serial No. 508,374

8 Claims. (Cl. 252—36)

This invention relates to lubricants. More particularly it relates to grease compositions specially suitable for lubrication of surfaces exposed to high pressures and temperatures such as are encountered in the lubrication of plastic metal rolling mill bearings.

Much difficulty has been experienced in the lubrication of surfaces exposed to high temperatures and pressures. Bearings exposed to high temperatures of the order of about 250 to about 350° F. and shock loading of the order of about 20,000 to about 50,000 p. s. i. or even higher pressures present a very aggravated lubricating problem.

Roller bearings used to support the shafts of rolls in some metal rolling operations, e. g. in zinc rolling mills, operate at temperatures in the range of about 300 to about 350° F. and even higher, even though they are cooled by steam jets; these bearings are subjected intermittently to loads in excess of 50,000 p. s. i., e. g. 100,000 p. s. i. or even higher pressures. The combination of high temperature and shock loading, and particularly the latter, induces bearing disintegration as evidenced by pitting of the bearing surfaces, excessive wear and separation and loss of the bearing lubricant, all of which reduce bearing life to the point where bearing replacement becomes a major cost item in the operation of metal rolling mills, especially rolling mills operating on metals of a plastic nature, such as zinc.

It was found that oils are unsatisfactory for the lubrication of these bearings at high temperatures and pressures because of excessive oil loss, sludging and excessive oil cooling requirements. Ordinary greases likewise cannot withstand the high pressures and also result in excessive bearing disintegration and wear, and lubrication failure evidenced by welding or seizure of the surfaces to be lubricated. Commercial extreme pressure greases fail to protect the surfaces to be lubricated from disintegration and excessive wear.

It is an object of this invention to provide lubricants for surfaces exposed to high pressures at high temperatures. Another object of this invention is to provide lubricants for bearing surfaces subjected to high shock loads at high temperatures. An additional object of this invention is to provide lubricating greases which will protect bearing surfaces from disintegrative influences during the operation of bearings at high temperatures under high pressures. A further object of this invention is to provide lubricating greases for the bearings of metal rolling mills, especially plastic metal rolling mills.

I have found that greases, e. g. soda base greases, containing a minor proportion of a lead soap, a small proportion of an organic halogen compound and a small proportion of a stable inactive sulfur compound are markedly superior lubricants for bearings in rolling mill service or similar service.

By soda base greases I mean greases comprising a hydrocarbon oil and a sufficient proportion of a soda soap to produce a consistent lubricating grease, e. g. about 5 to about 50% of a soda soap, e. g. a soda tallow soap.

I can use any one of a wide variety of lead soaps. For example, I can use the lead soaps of the acids of animal, vegetable or marine oils or fats, naphthenic acids, oxidized paraffin wax acids, etc. I have obtained excellent results with greases containing a lead fish oil soap prepared from litharge and menhaden oil. The lead soaps can be incorporated in my novel grease compositions to a lesser extent than the soda soaps, in the range of about 1 to about 15% by weight of the finished greases.

The organic halogen compounds to be used in the grease compositions of my invention must have a low vapor pressure and must be resistant to thermal decomposition and hydrolysis under the bearing operating conditions, e. g. temperatures in the range of about 300 to about 400° F. and pressures above about 50,000 p. s. i., e. g. 100,000 p. s. i. or even higher pressures. Although a number of halogen compounds will satisfy the above requirements, I have found halogenated waxes to be particularly advantageous for use in my greases.

Thus I can use chlorinated, brominated or fluorinated petroleum hydrocarbon waxes having melting points in the range of about 50 to about 150° F. and containing about 5 to about 60% by weight of halogen in the molecule or even more. I prefer to use a chlorinated paraffin wax containing about 35 to about 45% by weight of chlorine in the molecule, whose proportion in the finished grease can be between about 0.2 and about 15%.

In order to enhance the stability of the halogenated paraffin wax under high temperatures and pressures, I can blow the halogenated wax with nitrogen, steam or air, or add basic reagents, to remove free halogen and halogen acid. Also, the halogenated wax can be subjected further to treatment with a condensing agent to remove any unstable halogenated compounds contained therein, e. g. treatment with about 0.1 to 10% of AlCl₃, FeCl₃, ZnCl₂, SnCl₄ or the like at temperatures of about 50 to about 200° F., optionally in the presence of added aromatic hydrocarbons, following which the sludge produced by the treatment is withdrawn.

In general, I use a sufficient amount of halogenated wax in my novel grease compositions to furnish about 0.1 to about 5.0% by weight of halogen in the finished grease. Although I have found halogenated waxes to be particularly useful for the purposes of my invention, I can nevertheless use other organic halogen compounds in their stead. Thus, I can use halogenated olefin polymers of high molecular weight, e. g. halogenated polymers of ethylene, propylene or normal butylenes having molecular weights above about 1000, e. g. 10,000 or even higher, and containing about 10 to about 50% by weight of halogen in the molecule. Halogenated polymers of branched-chain olefins, such as isobutylene are less stable thermally than the corresponding halogenated polymers of straight-chain olefins. I can also use chlorinated or hydrochlorinated natural or synthetic rubbers containing about 10 to about 70% of chlorine. Of the halogenated polymers I prefer to use the chlorinated polymers.

Other halogen compounds which can be used for the purposes of my invention comprise halogenated petroleum fractions such as halogenated kerosene or lubricating oil fractions, or halogenated solvent extracts of the above fractions, or the like. These halogenated petroleum fractions can be stabilized before use by the treatments described above for the stabilization of halogenated waxes. The halogenated petroleum fractions can contain about 5 to about 50% of halogen by weight, preferably about 30 to about 50% by weight.

I can also use halogenated aromatic compounds, e. g. chlorinated benzenes, naphthalene, diphenyl, diphenyl oxide, anthracene or the like, containing about 10 to about 80% by weight of halogen, preferably about 25 to about 50% by weight of halogen.

In place of the individual halogen compounds designated above, I can use mixtures thereof, e. g. a mixture of a chlorinated paraffin wax and a chlorinated polymer of propylene having a molecular weight greater than 1000.

In general organic halogen compounds can be used in my grease compositions in proportions sufficient to furnish about 0.1 to about 5.0% by weight of halogen, based on the finished grease.

It is not intended to imply that halogen compounds within each of the above classes or in various classes are substantially equivalent in quality or effect. However, they can all be used for the purpose of my invention.

The halogen compounds to be used in my invention can be stabilized or inhibited against the production of corrosive products by the addition of various materials. Suitable stabilizers include basic nitrogen compounds such as the amines: aniline, toluidine, diphenylamine, phenylenediamine, phenyl-beta-naphthylamine, hexamethylenetetramine, dicyclohexylamine, cyclohexylamine-formaldehyde, ditetrahydrofurfuryl amine, guanidine, diphenylguanidine; urea and substituted ureas such as arylureas, ureides and thioureas; polymeric basic amino-nitrogen-containing materials, as described in U. S. Patents 2,190,776 and 2,281,567; mono-alkyl or mono-aralkyl ethers of hydroquinone; mercaptans, e. g. butyl mercaptan and heptyl mercaptan; ethylene oxide derivatives such as 1-methyl-, -ethyl-, phenyl-, or -benzylethylene oxide, etc.; pine oil; calcium phenyl stearate; inorganic alkaline materials such as alkali and alkaline earth metal oxides, hydroxides, carbonates or bicarbonates, including those of zinc and magnesium. The proportion of inhibitor to be used will vary with the particular halogen compound sought to be stabilized and the particular inhibitor or stabilizer chosen for that purpose. In general the proportion of stabilizer will fall within the range of about 0.01 to about 10% by weight, usually about 0.01 to about 3% by weight, based on the halogen compound to be stabilized.

The greases of my invention contain about 2 to about 15% by weight of a stable inactive sulfur compound. By a stable sulfur compound I mean one which is not subject to appreciable evaporation loss, hydrolysis or thermal decomposition under the bearing operating conditions. By inactive sulfur compounds I mean to denote sulfur compounds containing sulfur in firm chemical combination in the molecule and not normally corrosive to metal bearing surfaces, as distinguished from active or loose sulfur compounds wherein sulfur is held physically or in loose chemical combination so that they are normally corrosive to metal bearing surfaces.

I have found that particularly useful inactive sulfur compounds for use in my greases are sulfurized unsaturated mono-esters. These esters can contain from about 5 to about 20% by weight of sulfur in the molecule. The unsaturation may be present in the alkyl group or in the acid group of the ester or in both. Thus, I can use sulfurization products of esters having the formula

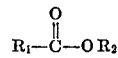

wherein R₁ and R₂ represent straight-chain aliphatic groups, one of said groups being saturated and the other being unsaturated.

Examples of mono-esters of saturated monovalent alcohols and unsaturated monovalent acids which can be sulfurized for use in my grease compositions are the esters formed from oleic acid and methyl, ethyl, n-propyl, isopropyl, butyl, amyl, hexyl, lauryl and cetyl alcohols, or the like.

Examples of mono-esters of unsaturated monovalent alcohols and saturated acids which can be sulfurized for use in my grease compositions are allyl palmitate, decylene laurate, dodecylene caprylate, oleyl butyrate, or the like.

I can also use the sulfurization products of unsaturated esters formed from unsaturated monovalent alcohols and unsaturated monovalent acids, e. g. allyl oleate, dodecylene oleate, or the like.

Particularly suitable natural sources of unsaturated esters which can be sulfurized to produce stable inactive sulfur compounds for the purpose of my invention are sperm oil and Arctic sperm oil (Bottlenose oil). These oils have been described by J. Lewkowitsch in "Chemical Technology and Analysis of Oils, Fats and Waxes"— volume II (1922)—pp. 872ff. I can use either commercial or specially refined sperm oils, although the former are to be preferred. The sperm oils can be sulfurized by treatment with sulfur, sulfur chloride or the like in accordance with known sulfurization techniques to produce neutral, stable inactive sulfurized oils containing about 5 to about 20% by weight of sulfur, which can be used in the greases of my invention in proportions varying between about 2 and about 15% by weight based on the finished greases.

A grease composition which is illustrative of my invention is as follows. All parts are by weight.

| | |
|---|---:|
| Soda tallow soap | 75 |
|     Prime tallow | 11.91 |
|     NaOH | 1.72 |
|     Hydrocarbon oil [1] | 61.4 |
| Lead fish oil soap | 3 |
|     Menhaden oil | 1.32 |
|     Litharge | 0.57 |
|     Lard oil | 0.86 |
|     Pine tar | 0.43 |
| Chlorinated paraffin wax (40% chlorine) | 1.25 |
| Sulfurized sperm oil (10% sulfur) | 5 |
| Hydrocarbon oil [1] | 15.75 |
| | 100.00 |

This grease will hereinafter be referred to as grease D.

Comparative tests were made with the above grease and conventional extreme pressure lubricating greases having the following compositions, given in parts by weight. These tests are illustrative but not limitative of my invention.

*Grease A*

| | |
|---|---:|
| Acidless tallow oil | 19.37 |
| Dry NaOH | 2.70 |
| Hydrocarbon oil [1] | 47.93 |
| Sulfurized lard (6.7% sulfur) | 30.00 |
| | 100.00 |

*Grease B*

| | |
|---|---:|
| Standard fatty acids | 18.00 |
| Ca(OH)$_2$ | 2.40 |
| Dry NaOH | 0.07 |
| Water | 1.00 |
| Hydrocarbon oil [1] | 41.80 |
| Sulfurized cottonseed oil (7.7% sulfur) | 26.00 |
| Lead fatty acid soap | 12.15 |
|     Standard fatty acids | 4.4 |
|     Litharge | 1.75 |
|     Heavy black oil | 5.4 |
|     Pine tar | 0.6 |
| | 101.42 |

*Grease C*

| | |
|---|---:|
| Tallow oil | 15.0 |
| NaOH | 2.2 |
| Hydrocarbon oil [1] | 64.8 |
| Lead fatty acid soap | 3.0 |
| Sulfurized lard (6.7% sulfur) | 15.0 |
| | 100.0 |

The comparative tests were carried out by applying the greases in turn to roller bearings supporting the shafts of the rolls in the finishing stands of two zinc strip rolling mills. The bearings were cooled by open steam jets. Bearing temperatures were variable but were above about 300° F. High intermittent bearing pressures are encountered in the course of the rolling process, upwards of 50,000 p. s. i. and often as much as 100,000 p. s. i. The salient features of the tests are expressed in the following tabulation, wherein greases A, B and C are those having the composition given above and wherein grease D has the composition given above as illustrative of my invention.

| Grease | Percent and kind of soap (approx.) | Percent added sulfur | Percent chlorine | Approx. avg. bearing life, hours | Primary cause of failure |
|---|---|---|---|---|---|
| A | 20—soda | 2.0 | None | 3,400 | Pitting. |
| B | 20—lime 5—lead | 2.0 | None | 2,000 | Grease separation. |
| C | 16—soda 3—lead | 1.0 | None | 4,000 | Wear. |
| D | 13—soda 2—lead | 0.5 | 0.5 | 5,000+ | Metal fatigue. |

The experimental data on which the tabulation above is based indicate that conventional extreme pressure greases containing sulfur compounds with or without added lead soaps fail for one reason or another to provide satisfactory lubrication for bearings operated at high temperatures under shock loads in a corrosive atmosphere. The test made with a grease D prepared in accordance with my invention indicates that failure was principally attributable, not to lubrication difficulties, but rather to fatigue in the bearing metal itself.

It will be apparent that I have provided novel and useful grease compositions which have proved to be the solution to a class of difficult lubrication problems. Although my invention has been described by reference to specific embodiments it is not to be limited thereto.

Although I prefer to use soda base greases, it should be understood that all or part of the sodium soap in these greases may be replaced by lithium, barium, aluminum or even lime soaps.

I claim:

1. A lubricant comprising between about 5 and about 50% of a soda soap, between about 1 and about 15% of a lead soap, an organic halogen compound having a low vapor pressure and being resistant to thermal decomposition and hydrolysis at temperatures in the range of about 250 to 400° F. and pressures above about 20,000 pounds per square inch, said halogen compound being present in quantity sufficient to furnish between about 0.1 and about 5% of halogen, between about 2 and about 15% of a sulfurized ester, said ester having the general formula

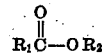

wherein $R_1$ and $R_2$ are aliphatic radicals at least one of which is unsaturated, and a hydrocarbon oil.

2. A lubricant comprising between about 5 and about 50% of a soda soap, between about 1 and about 15% of a lead fish oil soap, a chlorinated paraffin wax containing between about 35 and 45% of chlorine, said chlorinated paraffin wax being present in quantity sufficient to furnish between about 0.1 and about 5% of chlorine, between about 2 and about 15% of sulfurized sperm oil containing between about 5 and about 20% of sulfur, and a hydrocarbon oil.

3. A lubricating grease for zinc rolling mill bearings having the following composition:

| | Percent by weight |
|---|---|
| Soda tallow soap | 5 to 50 |
| Lead fish oil soap | 1 to 15 |
| Chlorinated paraffin wax containing 35 to 45% by weight of chlorine | 0.2 to 15 |
| Sulfurized sperm oil containing 5 to 20% by weight of sulfur | 2 to 15 |
| Hydrocarbon oil, remainder to make 100%. | |

---

[1] Viscosity 75 seconds Saybolt Universal at 210° F.

4. A lubricating grease for zinc rolling mill bearings consisting essentially of:

| | Parts by weight |
|---|---|
| Soda tallow soap prepared from: | |
| Prime tallow | 11.91 |
| NaOH | 1.72 |
| Hydrocarbon oil | 61.4 |
| Lead fish oil soap prepared from: | |
| Menhaden oil | 1.32 |
| Litharage | 0.57 |
| Lard oil | 0.86 |
| Pine tar | 0.43 |
| Chlorinated paraffin wax containing 40% chlorine | 1.25 |
| Sulfurized sperm oil containing 10% sulfur | 5 |
| Hydrocarbon oil | 15.75 |

5. A lubricant comprising a hydrocarbon oil, an organic halogen compound having a low vapor pressure and being resistant to thermal decomposition and hydrolysis at temperatures in the range of about 250 to 400° F. and pressures above about 20,000 pounds per square inch, said halogen compound being present in quantity sufficient to furnish between about 0.1 and about 5% of halogen, between about 2 and about 15% of a sulfurized ester, said ester having the general formula

wherein $R_1$ and $R_2$ are aliphatic radicals at least one of which is unsaturated, between about 5 and about 50% of a soap selected from the group consisting of sodium, lithium, barium, calcium, and aluminum soaps, and between about 1 and about 15% of a lead soap.

6. A lubricant comprising a hydrocarbon oil, a chlorinated paraffin wax in quantity sufficient to furnish between about 0.1 and about 5% of chlorine, between about 2 and about 15% of sulfurized sperm oil, between about 5 and about 50% of a soap selected from the group consisting of sodium, lithium, barium, calcium, and aluminum soaps, and between about 1 and about 15% of a lead soap.

7. A lubricant comprising between about 5 and about 50% of a soda soap, between about 1 and about 15% of a lead soap, an organic halogen compound having a low vapor pressure and being resistant to thermal decomposition and hydrolysis at temperatures in the range of about 250 to 400° F. and pressures above about 20,000 pounds per square inch, said halogen compound being present in quantity sufficient to furnish between about 0.1 and about 5% of halogen, between about 2 and about 15% of a sulfurized sperm oil, and a hydrocarbon oil.

8. A lubricant comprising between about 5 and about 50% of a soda soap, between about 1 and about 15% of a lead soap, a chlorinated paraffin wax in quantity sufficient to furnish between about 0.1 and about 5% of chlorine, between about 2 and about 15% of a sulfurized sperm oil, and a hydrocarbon oil.

WILLIAM P. HILLIKER.